United States Patent
Lee et al.

(10) Patent No.: US 7,623,959 B2
(45) Date of Patent: Nov. 24, 2009

(54) METHOD AND SYSTEM FOR PROVIDING VOICE-BASED SUPPLEMENTARY INFORMATION SERVICE USING ROAD MAP DATA

(75) Inventors: Joon Woo Lee, Seoul (KR); Jae Hyung Huh, Seoul (KR); Kyung Min Kim, Seoul (KR); Bong Su Um, Kyungki-do (KR); Dong Won Na, Kyungki-do (KR)

(73) Assignee: SK Telecom Co., Ltd., Seoul (KR)

( * ) Notice: Subject to any disclaimer, the term of this patent is extended or adjusted under 35 U.S.C. 154(b) by 548 days.

(21) Appl. No.: 11/244,888

(22) Filed: Oct. 5, 2005

(65) Prior Publication Data

US 2006/0122772 A1    Jun. 8, 2006

(30) Foreign Application Priority Data

Oct. 6, 2004    (KR) ............... 10-2004-0079318

(51) Int. Cl.
G01C 21/00    (2006.01)
(52) U.S. Cl. .............. 701/200; 701/117; 701/202; 701/207; 701/208; 701/211; 701/213; 340/988; 340/989; 340/990; 340/995.12; 340/995.24
(58) Field of Classification Search ......... 701/200–202, 701/208, 211, 213, 117, 300, 207; 340/988–995.28; 342/57, 357.06, 357.12
See application file for complete search history.

(56) References Cited

U.S. PATENT DOCUMENTS 6,873,905 B2 *  3/2005  Endo et al. ............. 701/202
6,879,838 B2 *  4/2005  Rankin et al. ........... 455/456.6
6,904,362 B2 *  6/2005  Nakashima et al. ...... 701/211
7,233,858 B2 *  6/2007  Sakatani ................. 701/200
2003/0055555 A1 *  3/2003  Knockeart et al. ....... 701/202
2004/0165553 A1 *  8/2004  Park ...................... 370/329
2004/0203909 A1 * 10/2004  Koster .................. 455/456.1

* cited by examiner

Primary Examiner—Khoi Tran
Assistant Examiner—Nikhil Sriraman
(74) Attorney, Agent, or Firm—Lowe Hauptman Ham & Berner, LLP

(57) ABSTRACT

The present invention relates to a method and system for providing voice-based supplementary information service using road map data. The voice-based supplementary information service system includes a content registration server for receiving content for the voice-based supplementary information service, and converting the content into supplementary information data having voice data format. At least one GPS satellite detects a location of the mobile communication terminal and transmits GPS radio waves, including the location information. A mobile communication terminal receives the location information and requests the road guidance service and the supplementary information service. A relay server relays requests for the road guidance service and the supplementary information service. A road search server generates road map data and transmits the road map data to the relay server. A user management server determines whether the request for the supplementary information service exists in the road map data. An information provision server verifies the type of supplementary information service, receives supplementary information data corresponding to the type from the content registration server, and generates supplementary information-added data in which the supplementary information data is included in a data area of the road map data.

19 Claims, 6 Drawing Sheets

FIG.2

| CLASSIFICATION | DESCRIPTION |
|---|---|
| NOTIFICATION ITEM | SERVICE RELATED NOTIFICATION AND MARKETING UTILITY |
| WEATHER INFORMATION | DESTINATION WEATHER INFORMATION(SEOUL AND 8 DISTRICTS OF WHOLE COUNTRY) |
| NEWS INFORMATION | LATEST NEWS FOLLOW-UP REPORTS |
| STOCK INFORMATION | CURRENT PRICE INFORMATION ABOUT SELECTED ITEMS (POSSIBLITY OF SETTING MAXIMUM ITEM) |
| NEARBY REGION INFORMATION | RANDOMLY SELECT AND PROVIDE INFORMATION ABOUT ONE REGION WITHIN RADIUS OF SEVERAL km SET BY USER, BASED ON GUIDE POINT AT INTERVAL WHICH IS NOT REACHED DURING GUIDANCE OF ROADS |
| DESTINATION TOUR INFORMATION | SELECT AND PROVIDE TOUR INFORMATION WITHIN RADIUS OF SEVERAL km FROM DESTINATION |

2A. SERVICE PROVIDABLE CONTENT

| CLASSIFICATION | DESCRIPTION |
|---|---|
| TEXT | CHARACTER CONTENT |
| IMAGE | IMAGE CONTENT(CONTENT HAVING DATA TYPE OF PNG, BMP, ETC.) |
| VOICE | VOICE CONTENT + EVRC FORMAT CONTENT |
| VOICE + TEXT | VOICE CONTENT + TEXT CONTENT |
| IMAGE + TEXT | IMAGE CONTENT + TEXT CONTENT |
| IMAGE + VOICE | IMAGE CONTENT + VOICE CONTENT |

2B. TYPE OF CONTENT TO BE PROVIDED

METHOD AND SYSTEM FOR PROVIDING VOICE-BASED SUPPLEMENTARY INFORMATION SERVICE USING ROAD MAP DATA

BACKGROUND OF THE INVENTION

1. Field of the Invention

The present invention relates, in general, to a method and system for providing voice-based supplementary information service using road map data and, more particularly, to a method and system for providing voice-based supplementary information service using road map data, which allow the user of a mobile communication terminal to be provided with supplementary information service together with road guidance service, using road map data including voice-based supplementary information.

2. Description of the Related Art

Recently, in order to provide communication services, such as the Internet, without space limitations, a great number of enterprises have accelerated the development of a new technology called the wireless Internet. The wireless Internet refers to environment and technology allowing a user to use Internet services over a wireless network while the user is traveling. The development of mobile phone-related technology and the rapidly increasing popularization of mobile phones are further promoting the development of the wireless Internet environment.

Meanwhile, of various wireless Internet services using mobile communication terminals, such as mobile phones or Personal Digital Assistants (PDAs), Location-Based Service (LBS) has greatly attracted attention due to its broad utility and convenience. Location-based wireless Internet service can be used for various fields and situations, such as rescue requests, responding to crime reports, a Geographic Information System (GIS) for providing information on a nearby region, the differentiation of mobile communication charges based on location, traffic information, car navigation and logistics control, or location-based Customer Relationship Management (CRM). Further, as a representative of such location-based service, there is a navigation service notifying a driver of routes along which a car has moved or is to move.

In the navigation service, since a Global Positioning System (GPS) reception function has been provided in mobile communication terminals, which are widely popularized because of the development of mobile communication service, various services, combining the unique function of mobile communication service with the function of GPS service, have been provided.

Recently, a mobile communication terminal having a GPS reception function is typically provided with navigation service in one of the following two types of services.

First, one type of service allows a mobile communication terminal to be equipped with a map, Point Of Interest (POI) information and a road search module for calculating a travel route, and allows the mobile communication terminal to perform road guidance without communicating with a server. The other type of service allows a server providing location-based service to perform a road search in consideration of traffic information varying in real time, and transmit road map data, generated as the result of a road search, to a mobile communication terminal through a wireless communication network, etc., thus providing road guidance.

However, when a user desires to be provided with supplementary information service, such as email/news/stock information, in addition to road guidance service, using a mobile communication terminal while being provided with road guidance service, the inconvenience of forcing the user to press a separate menu button on the mobile communication terminal and access required supplementary information service occurs every time.

SUMMARY OF THE INVENTION

Accordingly, the present invention has been made keeping in mind the above problems occurring in the prior art, and an object of the present invention is to provide a method and system for providing voice-based supplementary information service using road map data, which provide supplementary information service to the user of a mobile communication terminal together with road guidance service, using road map data including voice-based supplementary information, thus allowing the user of the mobile communication terminal to be provided with supplementary information service without personally accessing a content provision server, which provides supplementary information service, so as to be provided with separate supplementary information while being provided with road guidance service.

In accordance with one aspect of the present invention to accomplish the above object, there is provided a system for providing voice-based supplementary information service to a mobile communication terminal being provided with road guidance service, using road map data, comprising a content registration server for receiving content for the voice-based supplementary information service, converting the content into supplementary information data having voice data format, and storing the supplementary information data; at least one Global Positioning System (GPS) satellite for detecting a location of the mobile communication terminal and transmitting GPS radio waves, including the location information, to the mobile communication terminal; the mobile communication terminal for receiving the location information from the GPS satellite and requesting the road guidance service and the supplementary information service; a mobile communication network for transmitting or receiving data to or from the mobile communication terminal in a wireless manner; a relay server connected to the mobile communication network and adapted to relay requests for the road guidance service and the supplementary information service, received from the mobile communication terminal; a road search server connected to the relay server and adapted to generate road map data and transmit the road map data to the relay server so as to provide the road guidance service requested by the mobile communication terminal; a user management server for determining whether the request for the supplementary information service from the mobile communication terminal exists in the road map data received by the relay server, and transmitting determination results to the relay server; and an information provision server for receiving the road map data from the relay server, verifying the type of supplementary information service included in the road map data, receiving supplementary information data corresponding to the type from the content registration server, and generating supplementary information-added data in which the supplementary information data is included in a data area of the road map data.

In accordance with another aspect of the present invention to accomplish the above object, there is provided a method of providing voice-based supplementary information service to a mobile communication terminal being provided with road guidance service, using road map data in a system including a content registration server, at least one GPS satellite, a mobile communication terminal, a mobile communication network, a relay server, a road search server, a user management server and an information provision server, the method comprising the steps of (a) the content registration server storing supplementary information data; (b) the mobile communication terminal requesting road guidance service, including supplementary information service, from the road search server; (c) the road search server generating road map data for the mobile communication terminal; (d) receiving the road map data from the road search server, and requesting the user management server to determine whether a request for the supplementary information service exists in the road map data; (e) if it is determined that a request for the supplementary information service from the mobile communication terminal exists at step (d), transmitting the road map data to the information provision server; (f) analyzing the road map data and reconstructing an area of the supplementary information data within a data area of the road map data; (g) searching the content registration server for supplementary information data corresponding to supplementary information service requested by the mobile communication terminal, and extracting the supplementary information data; and (h) generating supplementary information-added road map data, in which the supplementary information data is included in the road map data, and transmitting the supplementary information-added road map data to the mobile communication terminal.

BRIEF DESCRIPTION OF THE DRAWINGS

The above and other objects, features and other advantages of the present invention will be more clearly understood from the following detailed description taken in conjunction with the accompanying drawings, in which:

FIG. 2 is a diagram showing the type and format of content provided by a content provision server according to an embodiment of the present invention;

DESCRIPTION OF THE PREFERRED EMBODIMENTS

Preferred embodiments of the present invention are described with reference to the attached drawings. In the following description of the present invention, detailed descriptions may be omitted if it is determined that the detailed descriptions of related well-known functions and construction may make the gist of the present invention unclear.

In the embodiments of the present invention, a mobile communication network or wireless communication network is described as a Code Division Multiple Access (CDMA) mobile communication network, but is not limited to the above embodiments, and is a broad concept including any mobile communication network for relaying wireless data between terminals, such as a Wideband-CDMA (W-CDMA) mobile communication network or a High-speed Portable Internet (HPi) mobile communication network.

In the embodiments of the present invention, for convenience of description, it is assumed that a mobile communication terminal requests and is provided with both road guidance service and supplementary information service. It is also possible to request and be provided with only road guidance service.

Figure 1:
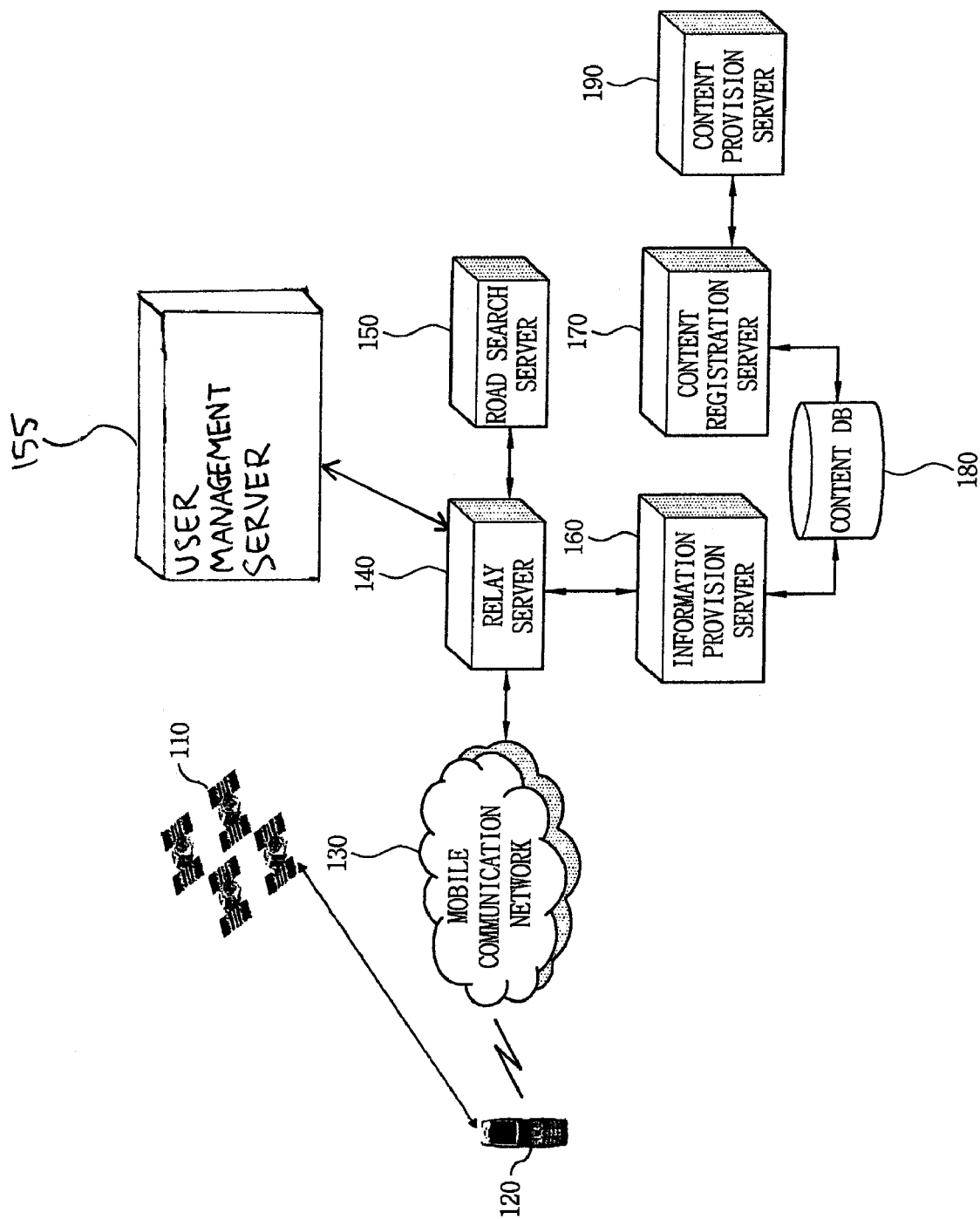
FIG. 1 is a diagram schematically showing a system for providing voice-based supplementary information service using road map data according to an embodiment of the present invention.

FIG. 1 is a diagram schematically showing a system for providing voice-based supplementary information service using road map data according to an embodiment of the present invention.

The system for providing voice-based supplementary information service using road map data according to the embodiment of the present invention includes GPS satellites 110, a mobile communication terminal 120, a mobile communication network 130, a relay server 140, a user management server 155, a road search server 150, an information provision server 160, a content registration server 170, a content Database (DB) 180, and a content provision server 190.

The GPS satellites 110 according to the embodiment of the present invention are required for a Global Positioning System (GPS) to detect the location of the mobile communication terminal 120. In the GPS, the GPS satellites 110 include 24 satellites for successively transmitting location information, which is navigation data required to calculate a location, to the mobile communication terminal 120 through a carrier wave. Of the satellites, 21 satellites are used for navigation, and 3 satellites are held in reserve.

The arrangement of the GPS satellites 110 is designated so that at least four satellites are always visible from anywhere on the earth so as to calculate the three-dimensional location of the mobile communication terminal 120 and determine an error in a clock provided in the mobile communication terminal 120. Data, transmitted by each GPS satellite 110 in the form of radio waves, includes Pseudo Random Noise (PRN) code that is uniquely designed depending on the number of each GPS satellite. That is, since location information, which is navigation data, is transmitted to mobile communication terminal 120 through GPS waves transmitted by each GPS satellite 110, in Code Division Multiple Access (CDMA) mode, the mobile communication terminal 120 can precisely receive the location information, which is the navigation data transmitted by each GPS satellite in the form of radio waves.

The mobile communication terminal 120 according to the embodiment of the present invention is a terminal that requests road guidance service from the road search server 150, transmits location information, including navigation data received from the GPS satellites 110, to the road search server 150 through the mobile communication network 130, and is provided with road guidance service by the road search server 150, when a user desires to be provided with the road guidance service using a terminal equipped with a GPS receiver capable of receiving GPS radio waves from the GPS satellites 110. Further, the mobile communication terminal 120 according to the embodiment of the present invention requests supplementary information service from the road search server 150 together with road guidance service when desiring to be provided with the supplementary information service. In this case, the road guidance service is service indicating a travel route to a place, to which the user of the mobile communication terminal 120 desires to go, in the format of voice, text and images.

In this case, the request signals for the road guidance service and supplementary information service, received from the mobile communication terminal 120, are transmitted to the road search server 150 through the mobile communication network 130 and the relay server 140. Road map data generated by the road search server 150 is transmitted to the information provision server 160 through the relay server 140. Then, the information provision server 160 searches the content DB 180 for supplementary information requested by the user, and transmits voice-based supplementary information data to the mobile communication terminal 120 through the relay server 140 and the mobile communication network 130, together with the road map data provided by the road search server 150. In the present invention, it is preferable that the information provision server 160 generate supplementary information-added road map data, in which supplementary information data is included in a data area of the road map data (hereinafter referred to as "supplementary information-added data"), and transmit the supplementary information-added data to the mobile communication terminal 120.

FIG. 2 is a diagram showing the type and format of content provided by the content provision server according to an embodiment of the present invention.

Referring to FIG. 2, as shown in 2A, supplementary information service includes a notification item, such as a notification related to service desired by the user of the mobile communication terminal or the advertisement of the content provision server, weather information about a destination desired by the user and a travel route, news information, such as the latest news or follow-up reports, stock information about stock items selected by the user, nearby region information about regions within a radius of several km set by the user, destination tour information about sightseeing places within a radius of several km from the destination set by the user, etc. Further, as shown in 2B, the supplementary information service can be provided in various formats, such as text, image, voice, voice+text, image+text or image+voice. However, in the embodiment of the present invention, it is assumed that service is provided in the format of voice-based data.

Therefore, in the preferred embodiment of the present invention, it is preferable that the supplementary information service be provided to the mobile communication terminal in voice format while the road guidance service is provided in voice format.

Figure 3:
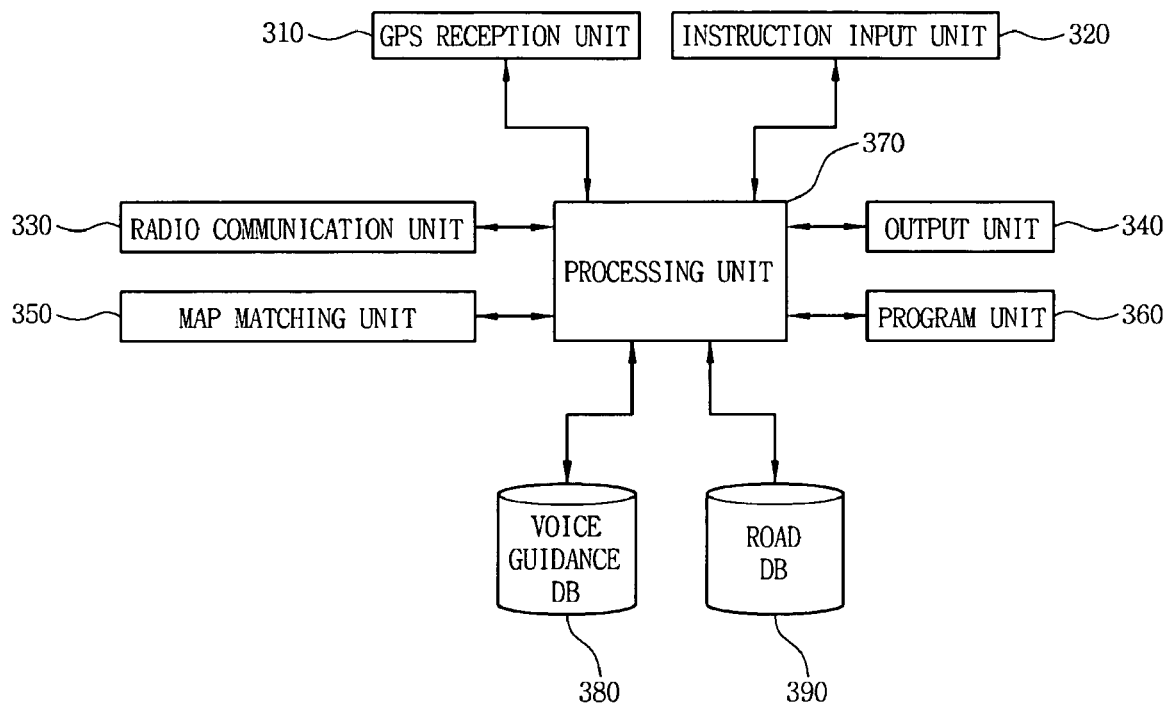
FIG. 3 is a block diagram briefly showing the construction of a mobile communication terminal according to an embodiment of the present invention.

FIG. 3 is a block diagram briefly showing the construction of the mobile communication terminal according to an embodiment of the present invention.

Referring to FIG. 3, the mobile communication terminal according to the embodiment of the present invention includes a GPS reception unit 310, an instruction input unit 320, a radio communication unit 330, an output unit 340, a map matching unit 350, a program unit 360, a processing unit 370, a voice guidance DB 380 and a road DB 390.

The GPS reception unit 310 receives GPS radio waves, including location information about the mobile communication terminal 120, from the GPS satellites 110.

The instruction input unit 320 receives various instructions and a destination name required to request road guidance service for a destination desired by the user and supplementary information service from the user of the mobile communication terminal 120.

The radio communication unit 330 is a module for communicating with the mobile communication network 130 in a wireless manner so as to request and be provided with service desired by the user. In the preferred embodiment of the present invention, the radio communication unit 330 transmits request signals for the road guidance service and the supplementary information service desired by the user to the road search server 150 through the mobile communication network 130, and receives supplementary information-added data, generated by the information provision server 160, through the mobile communication network 130.

The output unit 340 displays the content of the road guidance service and the supplementary information service, provided to the mobile communication terminal 120, in the format of voice, text and images.

The map matching unit 350 compares the road map data, included in the supplementary information-added data, with current location data, which is verified using location information received from the GPS satellites 110 through the GPS reception unit 310, and determines whether the mobile communication terminal 120 is deviating from a route.

The program unit 360 performs road guidance through the cooperation between the road map data included in the supplementary information-added data and the map matching unit 350, and determines whether supplementary information data is included in the supplementary information-added data. Further, the program unit 360 processes supplementary information data and then notifies the user of road map information and supplementary information through the output unit 340.

The processing unit 370, which is a module for controlling the overall operation of the mobile communication terminal 120, processes location information received from the GPS reception unit 310, verifies the supplementary information-added data, provided by the road search server 150 and the information provision server 160, searches the voice guidance DB 380 and the road DB 390 for required data, and transmits found data to the output unit 340. The processing unit 370 is provided with a map by the road DB 390 and displays road search data on the provided map. Further, the processing unit 370 analyzes the supplementary information data, searches the voice guidance DB 380 for matched voice data, and transmits found voice data to the output unit 340.

The voice guidance DB 380 stores therein voice data required to support road guidance in voice format, for example, "turn left" or "turn right".

The road DB 390 stores received road map data and supplementary information data.

The mobile communication network 130 transmits the request signals for the road guidance service and the supplementary information service, received from the mobile communication terminal 120, to the road search server 150 through the relay server 140, and transmits the supplementary information-added data, received from the information provision server 160 through the relay server 140, to the mobile communication terminal 120.

The relay server 140 is connected to the road search server 150 and the information provision server 160, and is adapted to transmit road map data, generated by the road search server 150, to the mobile communication terminal 120 or the information provision server 160. Further, the relay server 140 transmits the road map data to the user management server 155, and transmits the road map data to the mobile communication terminal 120 or the information provision server 160 depending on the result of determination of the user management server 155 on whether a request for the supplementary information service exists in the road map data. If a request for the supplementary information service exists in the road map data as the result of determination of the user management server 155, the relay server 140 transmits the road map data to the information provision server 160. Further, if no request for the supplementary information service exists in the road map data as the result of determination of the user management server 155, the relay server 140 transmits the road map data to the mobile communication terminal 120.

The road search server 150, which is a server for providing road guidance service requested by the mobile communication terminal 120, receives location information from the mobile communication terminal 120 and generates road map data about a destination desired by the user. Further, the road search server 150 according to an embodiment of the present invention transmits the generated road map data to the information provision server 160 through the relay server 140. At this time, in a part of the data area of the road map data, information about whether the supplementary information service is requested by the mobile communication terminal 120 is preferably included. The road map data is transmitted to the mobile communication terminal 120 or the information provision server 160 depending on the determination of whether request information for the supplementary information service exists in the road map data. The determination is made by the user management server 155 connected to the relay server 140.

The user management server 155 is connected to the relay server 140, and is adapted to determine whether the request information for the supplementary information service exists in the road map data at the request of the relay server 140 that is provided with the road map data by the road search server 150, and to transmit the result of the determination to the relay server 140.

The information provision server 160 checks the supplementary information service request area in the road map data received from the road search server 150 through the relay server 140, verifies the type of supplementary information service requested by the mobile communication terminal 120, searches the content DB 180 for supplementary information data corresponding to the supplementary information service desired by the user, generates supplementary information-added road map data, in which supplementary information data is included in the data area of the road map data, and transmits the supplementary information-added road map data to the mobile communication terminal 120 through the relay server 140 and the mobile communication network 130.

Figure 4:
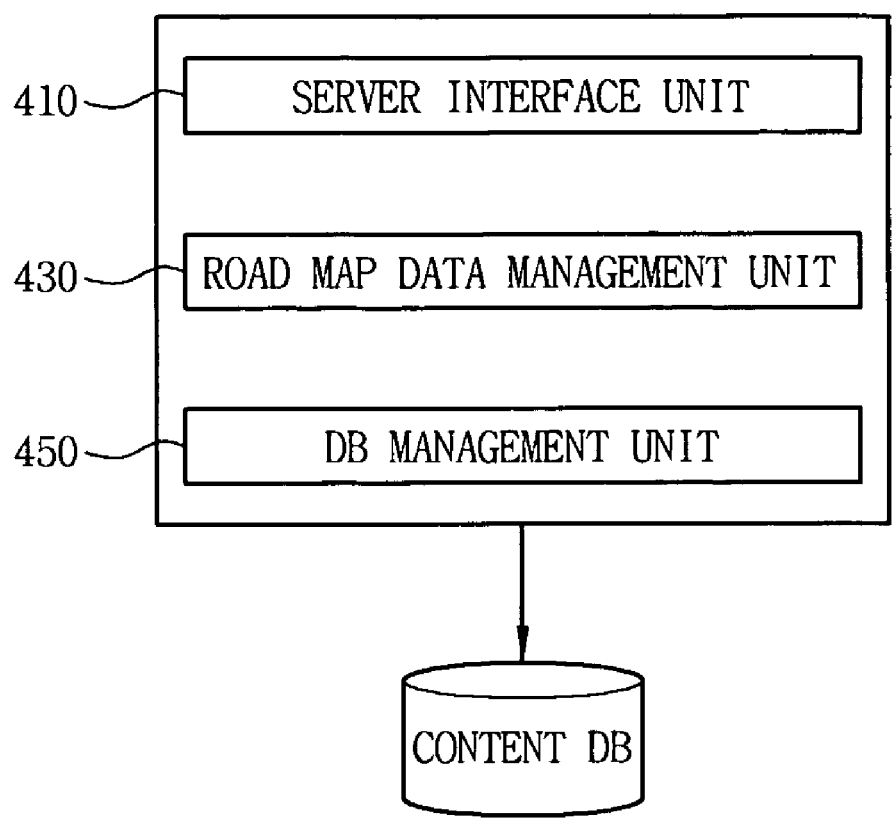
FIG. 4 is a block diagram briefly showing the construction of an information provision server according to an embodiment of the present invention.

FIG. 4 is a block diagram briefly showing the construction of the information provision server according to an embodiment of the present invention.

The information provision server according to the embodiment of the present invention includes a server interface unit 410, a road map data management unit 430 and a DB management unit 450.

The server interface unit 410 functions as an interface for transmitting/receiving data to/from the relay server 140 in conjunction with the relay server 140.

The road map data management unit 430 parses and analyzes the road map data received from the road search server 150, compares distances traveled until subsequent road map data is provided, or playing periods of supplementary information data, with each other, includes the supplementary information data, provided by the content DB 180, in the data area of the road map data, and then reconstructs the supplementary information-added data.

The DB management unit 450 analyzes the road map data received from the road search server 150 to determine whether the supplementary information service is requested by the mobile communication terminal 120, searches the content DB 180 for supplementary information data requested by the mobile communication terminal 120, and transmits found supplementary information data to the road map data management unit 430.

The content registration server 170 is a server for converting content for the supplementary information service, provided by the content provision server 190, into the form of various voice-based content, such as voice, text including voice or images including voice, thus generating supplementary information data. In the preferred embodiment of the present invention, the content registration server 170 stores the supplementary information data in the content DB 180.

In the embodiment of the present invention, the content DB 180 is constructed as a server separate from the content registration server 170, but may be constructed to be included in the content registration server 170 according to circumstances.

Figure 5:
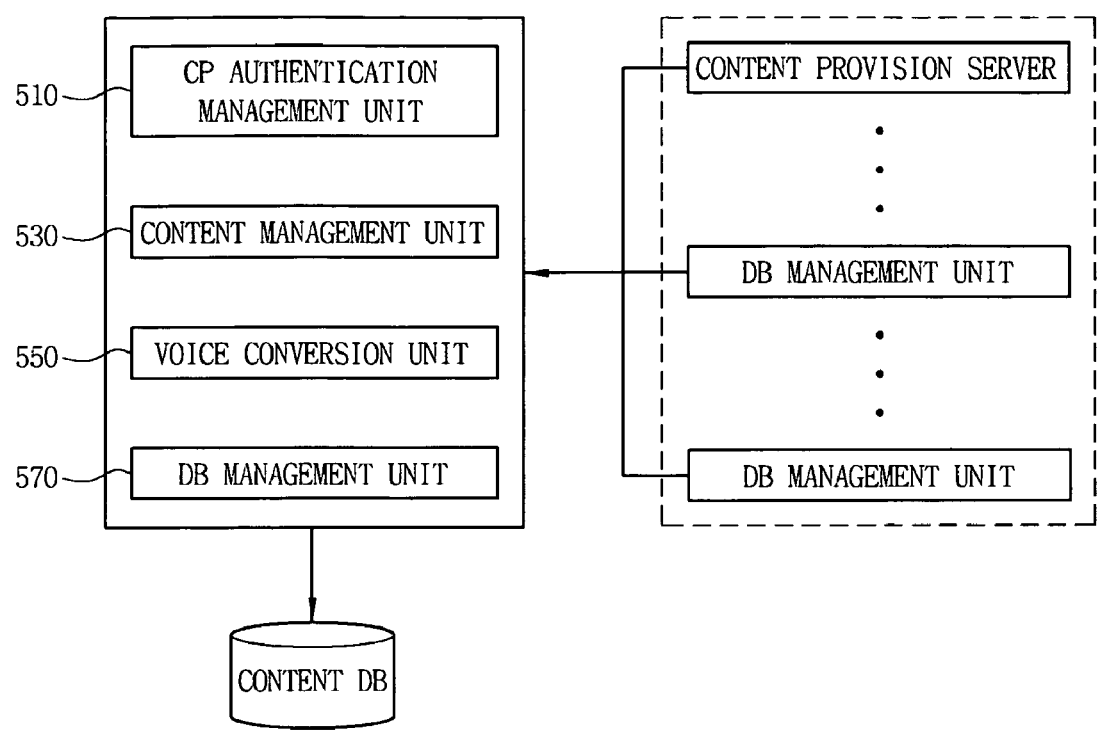
FIG. 5 is a block diagram briefly showing the construction of a content registration server according to an embodiment of the present invention.

FIG. 5 is a block diagram briefly showing the construction of the content registration server according to an embodiment of the present invention.

The content registration server according to the embodiment of the present invention includes a Content Provider (CP) authentication management unit 510, a content management unit 530, a voice conversion unit 550 and a DB management unit 570.

The CP authentication management unit 510 manages authentication related to authorization for the content provision server 190 to upload content for supplementary information service.

The content management unit 530 determines whether content uploaded by the content provision server 190 has been successfully uploaded.

The voice conversion unit 550 converts content registered by the content provision server 190 into voice files playable on the mobile communication terminal 120. Preferably, the voice conversion unit 550 converts the content into Enhanced Variable Rate Codec (EVRC) format.

In the preferred embodiment of the present invention, the voice conversion unit 550 utilizes a compression format using EVRC, in which data is transmitted at a bit rate of 8 kbps, for ease of transmission, but is not necessarily limited to the embodiment. It is also possible to convert content using Qualcomm Code Excited Linear Prediction (QCELP), Adaptive Multi-Rate (AMR), etc.

The DB management unit 570, in conjunction with the content DB 180, performs the function of registering, revising or deleting supplementary information data stored in the content DB 180.

The content DB 180 stores supplementary information data generated by the content registration server 170, and transmits the supplementary information data to the information provision server 160 at the request of the information provision server 160.

The content provision server 190 is a server for generating or providing content required to provide supplementary information service. In the present invention, the content provided by the content provision server 190 is preferably data convertible into voice format data.

Figure 6:
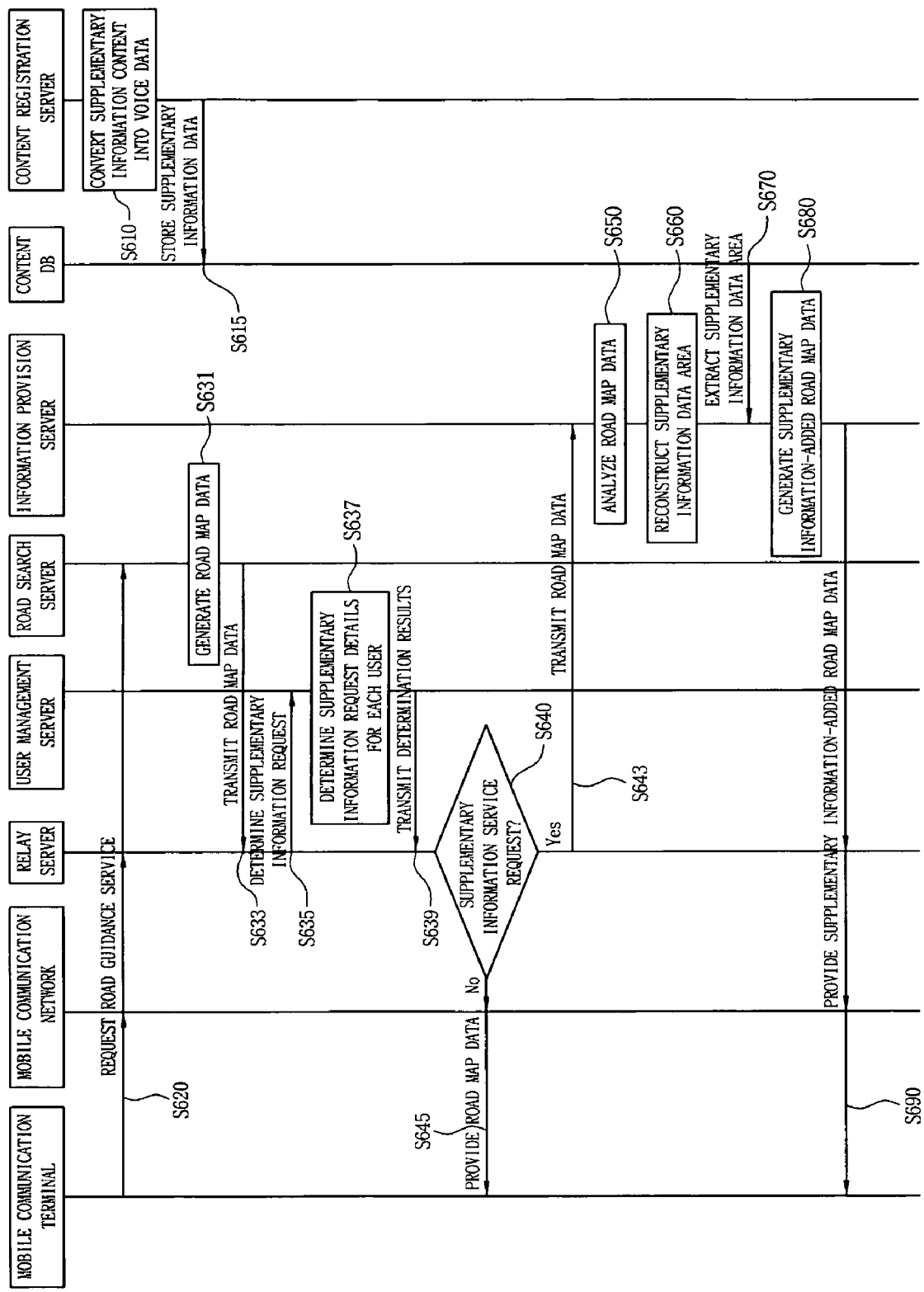
FIG. 6 is a flowchart of a method of providing voice-based supplementary information service using road map data according to the present invention.

FIG. 6 is a flowchart of a method of providing voice-based supplementary information service using road map data.

First, the content registration server 170 converts content for supplementary information service, uploaded by the content provision server 190, into voice format data at step S610, and stores the voice format data in the content DB 180 at step S615.

The mobile communication terminal 120 requests road guidance service from the road search server 150 through the mobile communication network 130 and the relay server 140, and transmits location information about the mobile communication terminal 120, received from the GPS satellites 110, to the road search server 150 at step S620. In this case, the mobile communication terminal 120 preferably transmits information about a destination, desired by the user of the mobile communication terminal 120, to the road search server 150 together with a supplementary information service request at the time of requesting the road guidance service. Then, the road search server 150 generates road map data, which is the data about an optimal travel route to the destination, using the destination information and location information received from the mobile communication terminal 120 at step S631.

Next, the road search server 150 transmits road map data to the relay server 140 at step S633. The relay server 140 requests the user management server 155 to determine whether a request for the supplementary information service exists in the road map data at step S635. Then, the user management server 155 determines whether a request for the supplementary information service exists in the road map data at step S637, and transmits the result of determination to the relay server 140 at step S639.

Then, the relay server 140 checks the result of determination of whether a request for the supplementary information service exists in the road map data received from the user management server 155, thus determining whether supplementary information service is requested by the mobile communication terminal 120 at step S640.

If it is determined that supplementary information service has been requested by the mobile communication terminal 120 at step S640, the relay server 140 transmits the road map data to the information provision server 180 at step S643.

In contrast, if it is determined that supplementary information service has not been requested by the mobile communication terminal 120 at step S640, the relay server 140 transmits the road map data to the mobile communication terminal 120 through the mobile communication network 130 at step S645.

Next, the information provision server 160 analyzes the road map data at step S650, thus verifying and analyzing supplementary information service desired by the user. The information provision server 160 reconstructs the area of the supplementary information data within the road map data to include the supplementary information data in the road map data at step S660. The information provision server 160 searches the content DB 180 for supplementary information data, which is data required for the supplementary information service desired by the user, at step S670. The information provision server 160 includes the supplementary information data in the road map data, thus generating the supplementary information-added data at step S680. The information provision server 160 transmits the supplementary information-added data to the mobile communication terminal 120, thereby providing both road guidance service and supplementary information service at step S690.

As described above, the present invention is advantageous in that it provides supplementary information service to the user of a mobile communication terminal together with road guidance service, using road map data including voice-based supplementary information, so that a series of procedures of pressing a menu button and accessing a supplementary information provision server so as to be provided with the supplementary information service while the user of the mobile communication terminal is provided with the road guidance service can be omitted, thus reducing the time required to provide service and providing convenience of use to the user of the mobile communication terminal.

Those skilled in the art will appreciate that the present invention can be implemented in other detailed embodiments, without departing from the technical spirit and essential features of the invention. Therefore, it should be understood that the above-described embodiments are only exemplary in all aspects, not restrictive. The scope of the present invention should be defined by the accompanying claims rather than the detailed description. Various modifications, additions and substitutions derived from the meaning and scope of the accompanying claims and equivalent concept thereof should be interpreted as being included in the scope of the present invention.

What is claimed is:

1. A system for providing voice-based supplementary information service to a mobile communication terminal being provided with road guidance service, using road map data, said system comprising:

a content registration server configured to receive content for the voice-based supplementary information service, convert the content into supplementary information data having voice data format, and store the supplementary information data;

at least one Global Positioning System (GPS) satellite configured to detect a location of the mobile communication terminal and transmit GPS radio waves, to the mobile communication terminal, the GPS radio waves including information regarding the location of the mobile terminal;

the mobile communication terminal configured to receive the information regarding the location of the mobile terminal from the GPS satellite and request the road guidance service and the supplementary information service;

a mobile communication network configured to transmit or receive data to or from the mobile communication terminal in a wireless manner;

a relay server connected to the mobile communication network and configured to relay requests for the road guidance service and the supplementary information service, received from the mobile communication terminal;

a road search server connected to the relay server and configured to generate road map data and transmit the road map data to the relay server so as to provide the road guidance service requested by the mobile communication terminal;

a user management server configured to determine whether the request for the supplementary information service from the mobile communication terminal exists in the road map data received by the relay server, and transmit determination results to the relay server, such that if it is determined that the request for the supplementary information service from the mobile communication terminal exists, the relay server transmits the road map data to an information provision server, or if it is determined that the request for the supplementary information service does not exist, the relay server transmits only the road map data without the supplementary information data to the mobile communication terminal; and the information provision server configured to receive the road map data from the relay server, verify the type of supplementary information service included in the road map data, receive supplementary information data corresponding to the type from the content registration server, and generate supplementary information-added data in which the supplementary information data is included in a data area of the road map data, such that the mobile communication terminal provides for the supplementary information service while providing for the road guidance service.

2. The voice-based supplementary information service provision system according to claim 1, wherein the supplementary information service includes a notification item, the notification item including at least one of a notification related to service desired by the user of the mobile communication terminal or advertisement of a content provision server, weather information about a destination desired by the user and a travel route, news information, including the latest news or follow-up reports, stock information about stock items selected by the user, nearby region information about regions within a radius of several km set by the user, or destination tour information about sightseeing places within a radius of several km from the destination set by the user.

3. The voice-based supplementary information service provision system according to claim 1, wherein the supplementary information service is provided in one or more formats selected from among text, images, voice, text including voice, text including images, and images including voice.

4. The voice-based supplementary information service provision system according to claim 1, wherein the road guidance service provides a travel route to a destination desired by the user of the mobile communication terminal, in one or more formats selected from among text, images, voice, text including voice, text including images, and images including voice.

5. The voice-based supplementary information service provision system according to claim 1, wherein the mobile communication terminal transmits a name of a destination and location information to the road search server.

6. The voice-based supplementary information service provision system according to claim 1, wherein the mobile communication terminal comprises:
- a GPS reception unit for receiving GPS radio waves, including the location information about the mobile communication terminal, from the GPS satellite;
- an instruction input unit for receiving instructions and a destination name required to request the road guidance service for the destination, desired by the user of the mobile communication terminal, and the supplementary information service;
- a radio communication unit for communicating with the mobile communication network in a wireless manner to request and be provided with service desired by the user of the mobile communication terminal;
- an output unit for outputting the road map data and the supplementary information data, provided to the mobile communication terminal, in one or more formats selected from among text, images, voice, text including voice, text including images, and images including voice;
- a map matching unit for comparing the road map data, included in the supplementary information data, with current location data that is verified using the location information received from the GPS reception unit, and determining whether the mobile communication terminal is deviating from a route;
- a program unit for performing road guidance through cooperation between the road map data, included in the supplementary information-added data, and the map matching unit, and determining whether the supplementary information data is included in the supplementary information-added data;
- a voice guidance DB for storing voice data required to support guidance of roads in voice format;
- a road DB for storing the road map data and the supplementary information data; and
- a processing unit for controlling overall operation of the mobile communication terminal, processing the location information received from the GPS reception unit, verifying the supplementary information-added data, provided by the road search server and the information provision server, searching the voice guidance DB and the road DB for required data, and transmitting found data to the output unit.

7. The voice-based supplementary information service provision system according to claim 6, wherein the radio communication unit transmits request signals for the road guidance service and supplementary information service desired by the user of the mobile communication terminal to the road search server through the mobile communication network, and receives the supplementary information-added data, generated by the information provision server, through the mobile communication network.

8. The voice-based supplementary information service provision system according to claim 1, wherein the road search server transmits the road map data to the information provision server through the relay server if it is determined that the request for the supplementary information service from the mobile communication terminal exists.

9. The voice-based supplementary information service provision system according to claim 1, wherein the information provision server comprises:
- a server interface unit for transmitting or receiving data to or from the relay server;
- a road map data management unit for parsing and analyzing the road map data, received from the road search server, and including the supplementary information data, provided by the content registration server, in a data area of the road map data, the road map data management unit parsing and analyzing the road map data based on distance until subsequent road map data is provided, or displaying periods of supplementary information data, with each other, thus reconstructing the supplementary information-added data; and
- a DB management unit for analyzing the road map data received from the road search server, determining whether the supplementary information service is requested by the mobile communication terminal, searching the content registration server for the supplementary information data requested by the mobile communication terminal, and transmitting found supplementary information data to the road map data management unit.

10. The voice-based supplementary information service provision system according to claim 1, wherein the content registration server generates the supplementary information data in which content for the supplementary information service is converted into one or more formats selected from among text, images, voice, text including voice, text including images, and images including voice.

11. The voice-based supplementary information service provision system according to claim 1, wherein the content registration server comprises:
- a Content Provider (CP) authentication management unit for managing authentication related to authorization for the content provision server to upload content for the supplementary information service;
- a content management unit for determining whether the content uploaded by the content provision server has been successfully uploaded;

a voice conversion unit for convening the content registered by the content provision server into a voice file playable on the mobile communication terminal; and a DB management unit for performing a function of registering, revising or deleting supplementary information data stored in a content provision server.

12. The voice-based supplementary information service provision system according to claim 11, wherein the voice conversion unit converts the content registered by the content provision server into Enhanced Variable Rate Codec (EVRC) format.

13. A method of providing voice-based supplementary information service to a mobile communication terminal being provided with road guidance service, using road map data in a system including a content registration server, at least one GPS satellite, a mobile communication terminal, a mobile communication network, a relay server, a road search server, a user management server and an information provision server, the method comprising the steps of:

(a) the content registration server storing supplementary information data;

(b) the mobile communication terminal requesting road guidance service, including supplementary information service, from the road search server;

(c) the road search server generating road map data for the mobile communication terminal;

(d) receiving the road map data from the road search server, and requesting the user management server to determine whether a request for the supplementary information service exists in the road map data;

(e) if it is determined that the request for the supplementary information service from the mobile communication terminal exists at step (d), transmitting the road map data to the information provision server, or if it is determined that the request for the supplementary information service from the mobile communication terminal does not exist at step (d), transmitting only the road map data without the supplementary information data to the mobile communication terminal;

(f) analyzing the road map data and reconstructing an area of the supplementary information data within a data area of the road map data;

(g) searching the content registration server for supplementary information data corresponding to supplementary information service requested by the mobile communication terminal, and extracting the supplementary information data; and (h) generating supplementary information-added road map data, in which the supplementary information data is included in the road map data, and transmitting the supplementary information-added road map data to the mobile communication terminal such that the mobile communication terminal provides for the supplementary information service while providing for the road guidance service.

14. The voice-based supplementary information service provision method according to claim 13, wherein step (a) is performed so that the content registration server receives content for the supplementary information service from a content provision server for providing supplementary information service, converts the content into the supplementary information data that is voice-based data, and stores the supplementary information data.

15. The voice-based supplementary information service provision method according to claim 13, wherein step (b) is performed so that the mobile communication terminal transmits location information about the mobile communication terminal, received from the GPS satellite, and a name of a destination to which the mobile communication terminal will move.

16. The voice-based supplementary information service provision method according to claim 13, wherein step (c) is performed to generate road map data, including a travel route to a destination of the mobile communication terminal, using location information and a name of the destination that are received from the mobile communication terminal.

17. The voice-based supplementary information service provision method according to claim 13, wherein the supplementary information service includes a notification item, the notification item including at least one of a notification related to service desired by the user of the mobile communication terminal or advertisement of a content provision server, weather information about a destination desired by the user and a travel route, news information, including the latest news or follow-up reports, stock information about stock items selected by the user, nearby region information about regions within a radius of several km set by the user, or destination tour information about sightseeing places within a radius of several km from the destination set by the user.

18. The voice-based supplementary information service provision method according to claim 13, wherein the supplementary information service is provided in one or more formats selected from among text, images, voice, text including voice, text including images, and images including voice.

19. The voice-based supplementary information service provision method according to claim 13, wherein the road guidance service provides a travel route to the destination, desired by the user of the mobile communication terminal, in one or more formats selected from among text, images, voice, text including voice, text including images, and images including voice.

* * * * *